(12) United States Patent
Hwang et al.

(10) Patent No.: US 8,606,426 B2
(45) Date of Patent: Dec. 10, 2013

(54) ALIGNMENT AND ANTI-DRIFT MECHANISM

(75) Inventors: Ing-Shouh Hwang, Taipei (TW); En-Te Hwu, Taipei (TW); Hans Ulrich Danzebrink, Braunschweig (DE); Hartmut Illers, Braunschweig (DE)

(73) Assignee: Academia Sinica, Taipei (TW)

( * ) Notice: Subject to any disclaimer, the term of this patent is extended or adjusted under 35 U.S.C. 154(b) by 866 days.

(21) Appl. No.: 12/604,722

(22) Filed: Oct. 23, 2009

(65) Prior Publication Data
US 2011/0098926 A1  Apr. 28, 2011

(51) Int. Cl.
G05D 23/00 (2006.01)

(52) U.S. Cl.
USPC ............... 700/299; 701/300; 850/4; 850/6; 850/24; 850/30; 250/201.3; 250/201.2; 250/306; 250/221; 250/307; 359/383; 359/368; 359/410; 73/105; 356/310; 356/622; 356/600

(58) Field of Classification Search
USPC ......... 700/299; 850/54, 24; 250/201.2, 201.3; 359/383
See application file for complete search history.

(56) References Cited

U.S. PATENT DOCUMENTS

| | | | | |
|---|---|---|---|---|
| 4,455,874 A * | 6/1984 | Paros | .............................. | 73/704 |
| 5,237,238 A | 8/1993 | Breghaus et al. | | |
| 5,247,503 A * | 9/1993 | Nomiyama et al. | ....... | 369/44.35 |
| 5,661,548 A * | 8/1997 | Imai | ................. | 355/55 |
| 5,687,032 A * | 11/1997 | Takeshita et al. | ............. | 359/822 |
| 5,965,249 A * | 10/1999 | Sutton et al. | ............... | 428/304.4 |
| 6,756,575 B2 * | 6/2004 | Tadano et al. | ............... | 250/201.5 |
| 6,801,650 B1 * | 10/2004 | Kikuchi et al. | ................ | 382/145 |
| 7,247,827 B1 | 7/2007 | Hwang et al. | | |
| 7,249,494 B2 * | 7/2007 | Hwang et al. | .................... | 73/105 |
| 7,316,419 B2 * | 1/2008 | Fischer | ......................... | 280/779 |
| 7,770,231 B2 * | 8/2010 | Prater et al. | ........................ | 850/6 |
| 7,778,389 B2 * | 8/2010 | Yoneyama | ....................... | 378/70 |
| 8,166,567 B2 * | 4/2012 | Phan et al. | ......................... | 850/1 |
| 2002/0096642 A1 | 7/2002 | Massie | | |
| 2004/0094711 A1 | 5/2004 | Lee et al. | | |
| 2004/0182410 A1 | 9/2004 | Gueret | | |

(Continued)

FOREIGN PATENT DOCUMENTS

JP   2003-215018   7/2003

OTHER PUBLICATIONS

Tien et al, "Iterative Control of Dynamics Coupling caused Errors in Piezoscanners During High Speed AFM operation", Nov. 2005, IEEE, pp. 921-931.*

(Continued)

*Primary Examiner* — Ryan Jarrett
*Assistant Examiner* — Olvin Lopez Alvarez
(74) *Attorney, Agent, or Firm* — Cesari and McKenna, LLP

(57) ABSTRACT

A system includes a displacement sensor, an actuator connected to the displacement sensor, and a feedback unit. The displacement sensor is configured to measure at least one of a relative position and a relative orientation between the displacement sensor and the target object. The feedback unit receives a signal from the displacement sensor related to the measured relative position or relative orientation and controls the actuator to move the displacement sensor on the basis of variations in the received signal arising due to a change in environmental conditions.

27 Claims, 18 Drawing Sheets

(56) References Cited

U.S. PATENT DOCUMENTS

| | | |
|---|---|---|
| 2006/0013345 A1* | 1/2006 | Lindell et al. .................. 375/344 |
| 2006/0109480 A1* | 5/2006 | Hidaka ........................ 356/600 |
| 2006/0284083 A1* | 12/2006 | Kurenuma et al. ............ 250/309 |
| 2007/0144244 A1* | 6/2007 | Ray ................................. 73/105 |
| 2007/0236163 A1* | 10/2007 | Heertjes et al. ................ 318/619 |
| 2008/0277582 A1* | 11/2008 | Shi et al. ....................... 250/309 |
| 2008/0288108 A1* | 11/2008 | Gross ............................ 700/254 |
| 2008/0319569 A1* | 12/2008 | Loopstra et al. .............. 700/110 |
| 2009/0079441 A1* | 3/2009 | Cathelin et al. ............... 324/613 |
| 2011/0004326 A1* | 1/2011 | Danzebrink et al. ............ 700/71 |
| 2011/0228440 A1* | 9/2011 | Kato et al. .................... 361/277 |
| 2012/0104253 A1* | 5/2012 | Tsuneta et al. ................ 250/307 |
| 2012/0127450 A1* | 5/2012 | Kanaya .......................... 355/72 |

OTHER PUBLICATIONS

E.-T. Hwu, S,-K. Hung, C.-W. Yang, Kuang-Yuh Huang, and I.-S. Hwang, "Real-time detection of linear and angular displacements with a modified DVD optical head," Nanotechnology (SCI), vol. 19, No. 115501. (2008).

E.-T. Hwu, S,-K. Hung, C.-W. Yang, Kuang-Yuh Huang, and I.-S. Hwang, "Simultaneous detection of translational and angular displacements of micromachined elements," Applied Physics Letters (SCI), vol. 91, No. 221908. (2007).

En-Te Hwu, Kuang-Yuh Huang, Shao-Kang Hung, and Ing-Shouh Hwang, "Measurement of the Cantilever Displacement Using a CD/DVD Pickup Head," Japanese Journal of Applied Physics (SCI), vol. 45, No. 3B, pp. 2368-2371 (2005).

* cited by examiner

MEASURE AT LEAST ONE OF A RELATIVE POSITION AND A RELATIVE ORIENTATION BETWEEN A DISPLACEMENT SENSOR AND A TARGET OBJECT.

RECEIVE, AT A FEEDBACK UNIT, A SIGNAL RELATED TO THE MEASURED RELATIVE POSITION OR RELATIVE ORIENTATION, THE SIGNAL HAVING A HIGH-FREQUENCY PORTION ARISING FROM MECHANICAL MOVEMENT OF THE TARGET OBJECT AND A LOW-FREQUENCY COMPONENT ARISING FROM SIGNAL DRIFT ARISING DUE TO A CHANGE IN ENVIRONMENTAL CONDITIONS.

ON THE BASIS OF VARIATIONS IN THE RECEIVED SIGNAL ARISING DUE TO A CHANGE IN ENVIRONMENTAL CONDITIONS, CONTROL AN ACTUATOR TO MOVE THE DISPLACEMENT SENSOR.

SET A SET POINT OF THE FEEDBACK UNIT.

Fig. 11B

MEASURE AT LEAST ONE OF A RELATIVE POSITION AND A RELATIVE ORIENTATION BETWEEN A DISPLACEMENT SENSOR AND A TARGET OBJECT.

RECEIVE, AT A FEEDBACK UNIT, A SIGNAL RELATED TO THE MEASURED RELATIVE POSITION OR RELATIVE ORIENTATION, THE SIGNAL HAVING A HIGH-FREQUENCY PORTION ARISING FROM MECHANICAL MOVEMENT OF THE TARGET OBJECT AND A LOW-FREQUENCY COMPONENT ARISING FROM SIGNAL DRIFT ARISING DUE TO A CHANGE IN ENVIRONMENTAL CONDITIONS.

ON THE BASIS OF VARIATIONS IN THE RECEIVED SIGNAL ARISING DUE TO A CHANGE IN ENVIRONMENTAL CONDITIONS, CONTROL AN ACTUATOR TO MOVE THE DISPLACEMENT SENSOR.

SET A SET POINT OF THE FEEDBACK UNIT.

SET AT LEAST ONE OF A DRIVING SPEED AND A DRIVING BANDWIDTH OF THE FEEDBACK UNIT.

Fig. 11D

MEASURE AT LEAST ONE OF A RELATIVE POSITION AND A RELATIVE ORIENTATION BETWEEN A DISPLACEMENT SENSOR AND A TARGET OBJECT.

RECEIVE, AT A FEEDBACK UNIT, A SIGNAL RELATED TO THE MEASURED RELATIVE POSITION OR RELATIVE ORIENTATION, THE SIGNAL HAVING A HIGH-FREQUENCY PORTION ARISING FROM MECHANICAL MOVEMENT OF THE TARGET OBJECT AND A LOW-FREQUENCY COMPONENT ARISING FROM SIGNAL DRIFT ARISING DUE TO A CHANGE IN ENVIRONMENTAL CONDITIONS.

ON THE BASIS OF VARIATIONS IN THE RECEIVED SIGNAL ARISING DUE TO A CHANGE IN ENVIRONMENTAL CONDITIONS, CONTROL AN ACTUATOR TO MOVE THE DISPLACEMENT SENSOR.

MAINTAIN A SUBSTANTIALLY CONSTANT RELATIVE POSITION OR RELATIVE ORIENTATION BETWEEN THE DISPLACEMENT SENSOR AND THE TARGET OBJECT.

Fig. 11F

MEASURE AT LEAST ONE OF A RELATIVE POSITION AND A RELATIVE ORIENTATION BETWEEN A DISPLACEMENT SENSOR AND A TARGET OBJECT.

↓

RECEIVE, AT A FEEDBACK UNIT, A SIGNAL RELATED TO THE MEASURED RELATIVE POSITION OR RELATIVE ORIENTATION, THE SIGNAL HAVING A HIGH-FREQUENCY PORTION ARISING FROM MECHANICAL MOVEMENT OF THE TARGET OBJECT AND A LOW-FREQUENCY COMPONENT ARISING FROM SIGNAL DRIFT ARISING DUE TO A CHANGE IN ENVIRONMENTAL CONDITIONS.

↓

ON THE BASIS OF VARIATIONS IN THE RECEIVED SIGNAL ARISING DUE TO A CHANGE IN ENVIRONMENTAL CONDITIONS, CONTROL AN ACTUATOR TO MOVE THE DISPLACEMENT SENSOR.

↓

REDUCE THE VARIATIONS IN THE RELATIVE POSITION OR RELATIVE ORIENTATION BETWEEN THE DISPLACEMENT SENSOR AND THE TARGET OBJECT.

Fig. 11G

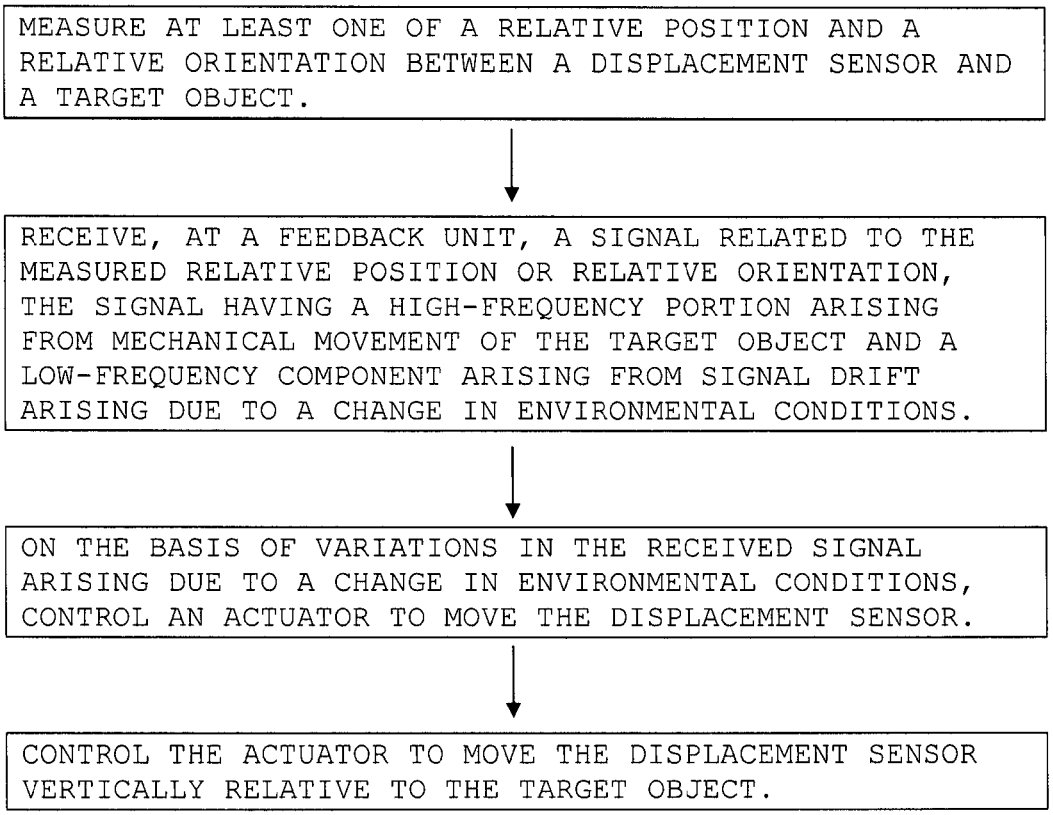

MEASURE AT LEAST ONE OF A RELATIVE POSITION AND A RELATIVE ORIENTATION BETWEEN A DISPLACEMENT SENSOR AND A TARGET OBJECT.

↓

RECEIVE, AT A FEEDBACK UNIT, A SIGNAL RELATED TO THE MEASURED RELATIVE POSITION OR RELATIVE ORIENTATION, THE SIGNAL HAVING A HIGH-FREQUENCY PORTION ARISING FROM MECHANICAL MOVEMENT OF THE TARGET OBJECT AND A LOW-FREQUENCY COMPONENT ARISING FROM SIGNAL DRIFT ARISING DUE TO A CHANGE IN ENVIRONMENTAL CONDITIONS.

↓

ON THE BASIS OF VARIATIONS IN THE RECEIVED SIGNAL ARISING DUE TO A CHANGE IN ENVIRONMENTAL CONDITIONS, CONTROL AN ACTUATOR TO MOVE THE DISPLACEMENT SENSOR.

↓

CONTROL THE ACTUATOR TO MOVE THE DISPLACEMENT SENSOR VERTICALLY RELATIVE TO THE TARGET OBJECT.

Fig. 11H

MEASURE AT LEAST ONE OF A RELATIVE POSITION AND A RELATIVE ORIENTATION BETWEEN A DISPLACEMENT SENSOR AND A TARGET OBJECT.

RECEIVE, AT A FEEDBACK UNIT, A SIGNAL RELATED TO THE MEASURED RELATIVE POSITION OR RELATIVE ORIENTATION, THE SIGNAL HAVING A HIGH-FREQUENCY PORTION ARISING FROM MECHANICAL MOVEMENT OF THE TARGET OBJECT AND A LOW-FREQUENCY COMPONENT ARISING FROM SIGNAL DRIFT ARISING DUE TO A CHANGE IN ENVIRONMENTAL CONDITIONS.

ON THE BASIS OF VARIATIONS IN THE RECEIVED SIGNAL ARISING DUE TO A CHANGE IN ENVIRONMENTAL CONDITIONS, CONTROL AN ACTUATOR TO MOVE THE DISPLACEMENT SENSOR.

CONTROL THE ACTUATOR TO MOVE THE DISPLACEMENT SENSOR BY CONTROLLING THE ACTUATOR TO MOVE THE DISPLACEMENT SENSOR LATERALLY RELATIVE TO THE TARGET OBJECT.

Fig. 11I

ALIGNMENT AND ANTI-DRIFT MECHANISM

CROSS-REFERENCE TO RELATED APPLICATIONS

This application is related to U.S. Pat. No. 7,247,827, filed May 31, 2006, and issued Jul. 24, 2007, and entitled "System for Measurement of the Height, Angle, and Their Variations of the Surface of an Object;" and to Taiwanese patent No. 1264520, issued Oct. 21, 2006, the contents of both of which are incorporated herein by reference.

This application is also related to U.S. application Ser. No. 12/604,711, filed Oct. 23, 2009, and entitled "Optical Imaging System," which issued as U.S. Pat. No. 8,269,157 on Sep. 18, 2012, the contents of which are incorporated herein by reference.

FIELD OF THE INVENTION

This invention relates to an alignment and anti-drift mechanism.

BACKGROUND

Methods such as beam deflection, astigmatic detection, and capacitance measurement are commonly used for micrometer scale and nanometer scale measurements of the position and orientation of a target object. These precision displacement measurement systems are sensitive to environmental changes, such as changes in temperature or humidity or changes to internal components of the system. For instance, beam deflection and astigmatic detection use optical measurement schemes involving a light source (e.g., a laser), lenses, and a photosensor. A change in ambient temperature or humidity may cause a change in the wavelength emitted by the light source. Thermal gradients caused by heat sources (such as the light source) within the displacement system and/or stress relaxation in components of the system can affect the separation between different components inside the displacement system, resulting in drift of the detection signals. A change in ambient temperature or humidity affects signals in the electronic circuits, such as circuitry in a displacement sensor of the system. Furthermore, the heat capacity of the instrument can cause a time delay of temperature-related drift. In general, the more components there are in a displacement measurement system, the more susceptible the system becomes to both internal and external environmental changes.

Thermal expansion is a main factor influencing signal drift. Even if a displacement sensor is fixed by firm mechanical attachment, the detected displacement signal representative of the spacing between the sensor and a target object may still drift with time due to a slow change in the spacing. For instance, aluminum is widely used in manufacturing the frame of many instruments because it is relatively inexpensive and easy to machine. Aluminum has a thermal expansion coefficient of $22.2\times10^{-6}$ m·K$^{-1}$. This means that if two components are fixed on an aluminum frame separated by a distance of 10 mm, a one degree increase in temperature will cause a 222 nm increase in spacing between the two components as a result of thermal expansion of the frame. Under the same conditions but using steel instead of aluminum for the frame, the increase in spacing would be 130 nm. Furthermore, each component in a precision displacement measurement system may have a different thermal expansion rate, and thus it is not always straightforward to predict the magnitude and the direction of drift in a displacement measurement. For a displacement measurement system with nanometer resolution, thermal drift of hundreds of nanometers seriously degrades the measurement precision and accuracy.

In many displacement measurement systems, the surface of a sample is positioned within a certain distance or angular range of the displacement sensor. For instance, an astigmatic detection system (ADS) measures translational displacement of a sample along one axis and angular displacement of the sample around two axes. The ADS includes an optical path mechanism in which a laser beam is focused on the surface of an object by a lens assembly. Light reflected from the object surface passes back through the lens assembly and forms a light spot on a photo sensor. The shape and position of the light spot on the photo sensor are used to determine translational and angular displacements of the object. The ADS is capable of detecting displacements of the object when the object surface is near the focal point of the detection light beam and/or within the linear region of the focus error signal of the ADS. The typical linear range of the focus error signal is about 6-8 µm. To adjust the height of the object surface to be within the linear region of the ADS, a fine linear translation stage may be used. However, even with a fine adjustment stage, signal drift problems still arise and can cause the object surface to drift out of the detection region of the ADS displacement sensor.

There are several strategies for minimizing or avoiding signal drift of a micrometer-scale or nanometer-scale displacement measurement system. The use of materials with a low thermal expansion coefficient, such as granite ($3.7\times10^{-6}$ m·K$^{-1}$), Invar® ($1.3\times10^{-6}$ m·K$^{-1}$), or Zerodur® ($0.02\times10^{-6}$ m·K$^{-1}$), reduces thermal expansion of the instrument, but such materials are expensive and difficult to machine. Alternatively, the environment of the displacement measurement can be carefully controlled by air conditioning or other ambient control systems. However, such systems can maintain the temperature and humidity only within a certain range. Further, actuators and sensors in the displacement measurement system are parasitic heat sources that create local time-varying temperature gradients that are not easily mitigated by room-level ambient control.

SUMMARY

In a general aspect, a system includes a displacement sensor, an actuator connected to the displacement sensor, and a feedback unit. The displacement sensor is configured to measure at least one of a relative position and a relative orientation between the displacement sensor and the target object. The feedback unit receives a signal from the displacement sensor related to the measured relative position or relative orientation and controls the actuator to move the displacement sensor on the basis of variations in the received signal arising due to a change in environmental conditions.

Embodiments may include one or more of the following. The change in environmental conditions includes at least one of a change in temperature or a change in humidity. The change in environmental conditions includes a local change in temperature. The variations in the received signal further arise from a relaxation of mechanical stress in the system.

The feedback unit controls the actuator on the basis of low frequency variations in the received signal. The frequency of the low frequency variations is less than about 1 Hz, or between about 1 µHz and 100 mHz.

The displacement sensor includes a photo detector and an objective lens positioned between the target object and the photo detector. The feedback unit includes an integrator, an amplifier, and a noise minimization unit. The relative position includes a vertical or a lateral separation between the displacement sensor and the target object.

The actuator is connected to the objective lens and the feedback unit controls the actuator to move the objective lens. The actuator includes a stack of piezoelectric ceramics or a voice coil motor. The actuator includes a damping material. The damping material is selected to reduce at least one of a resonance amplitude and a quality factor of the actuator, or to change a resonance frequency of the actuator.

In another aspect, a method includes measuring at least one of a relative position and a relative orientation between a displacement sensor and a target object; receiving, at a feedback unit, a signal related to the measured relative position or relative orientation; and, on the basis of variations in the received signal arising due to a change in environmental conditions, controlling an actuator to move the displacement sensor.

Embodiments may include one or more of the following. The method further includes setting a set point of the feedback unit. Controlling the actuator to move the displacement sensor comprises maintaining the received signal within a preselected range of the set point. The method further includes setting at least one of a driving speed and a driving bandwidth of the feedback unit. At least one of the driving speed and the driving bandwidth is varied on the basis of a deviation between the received signal and the set point of the feedback unit.

Controlling the actuator to move the displacement sensor comprises maintaining a substantially constant relative position or relative orientation between the displacement sensor and the target object. Controlling the actuator to move the displacement sensor comprises reducing the variations in the relative position or relative orientation between the displacement sensor and the target object. Controlling the actuator to move the displacement sensor comprises controlling the actuator to move the displacement sensor vertically relative to the target object. Controlling the actuator to move the displacement sensor comprises controlling the actuator to move the displacement sensor laterally relative to the target object.

An alignment and anti-drift mechanism as described herein has a number of advantages. Slowly varying signal drift in a precision displacement measurement system is markedly reduced, and alignment of the relative position and orientation between a target object and a displacement sensor in such a measurement system is maintained for as long as a day. This stability enables high resolution measurement of microscale and nanoscale features, such as structures in micro/nano electromechanical systems (MEMS/NEMS) devices, and of mechanical dynamics of microfabricated elements. Furthermore, vibrational noise in the system is reduced, thus allowing high resolution displacement measurements to be performed with a non-rigid actuator such as that used in CD and DVD optical heads.

BRIEF DESCRIPTION OF DRAWINGS

FIGS. 11A-11I show the limitations of claims 20-27.

DETAILED DESCRIPTION

Figure 1:
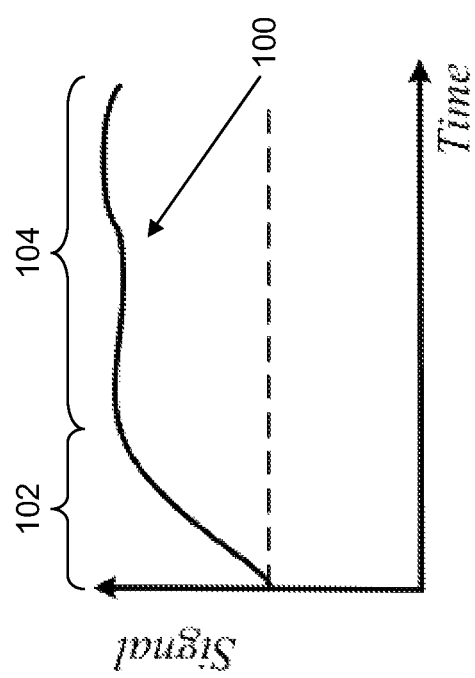
FIG. 1 is a plot of the time variation of a signal output from a displacement sensor.

Referring to FIG. 1, an output signal 100 in a displacement measurement system drifts quickly when the system is first turned on (region 102) and then stabilizes (region 104) within a few seconds to a few minutes, depending on the system. However, output signal 100 continues to drift slowly during the operation of the displacement measurement system. A large part of the signal drift is due to fluctuations in ambient temperature; if the displacement measurement system is operated with no environmental control and without any compensation for drift, the output signal drifts in a manner roughly proportional to the temperature change of the system. The signal may drift in a positive direction, as shown, or in a negative direction, depending on the thermal expansion characteristics of the materials in the displacement measurement system and on the presence or absence of a relaxation of mechanical stresses in the system.

Figure 2:
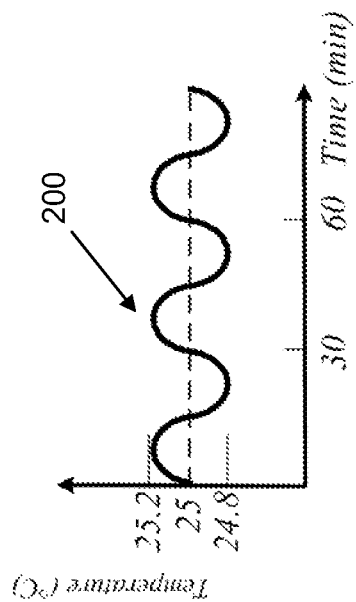
FIG. 2 is a plot of temperature variation with time for an air conditioned system.

Referring to FIG. 2, even if the displacement measurement system is located in a temperature-controlled room, there will still be small temperature variations in the room that depend on the accuracy of the temperature controlling system. For instance, if a temperature controlling system having an accuracy of ±0.2° C. is programmed to keep the temperature of a room at 25° C., the temperature in the room fluctuates sinusoidally (as shown in curve 200) with an average temperature of 25° C. and a period of 30 minutes. In this case, the frequency of the ambient temperature change is 0.55 mHz. This low-frequency temperature fluctuation causes a slow drift in the output signal of a displacement sensor in a displacement measurement system housed in the room. The drift rate of the output signal due to relaxation of mechanical stresses in components of the displacement measurement system or to changes in electronic characteristics of a displacement sensor is of a similar order of magnitude. In contrast, displacement signals related to the mechanical movement of an object have a frequency on the order of 100 mHz or higher, much faster than the drift rate. It is therefore possible to compensate for the slowly-varying drift of the displacement signal while still measuring the fast-varying displacement signal and other related signals derived therefrom.

Figure 3:
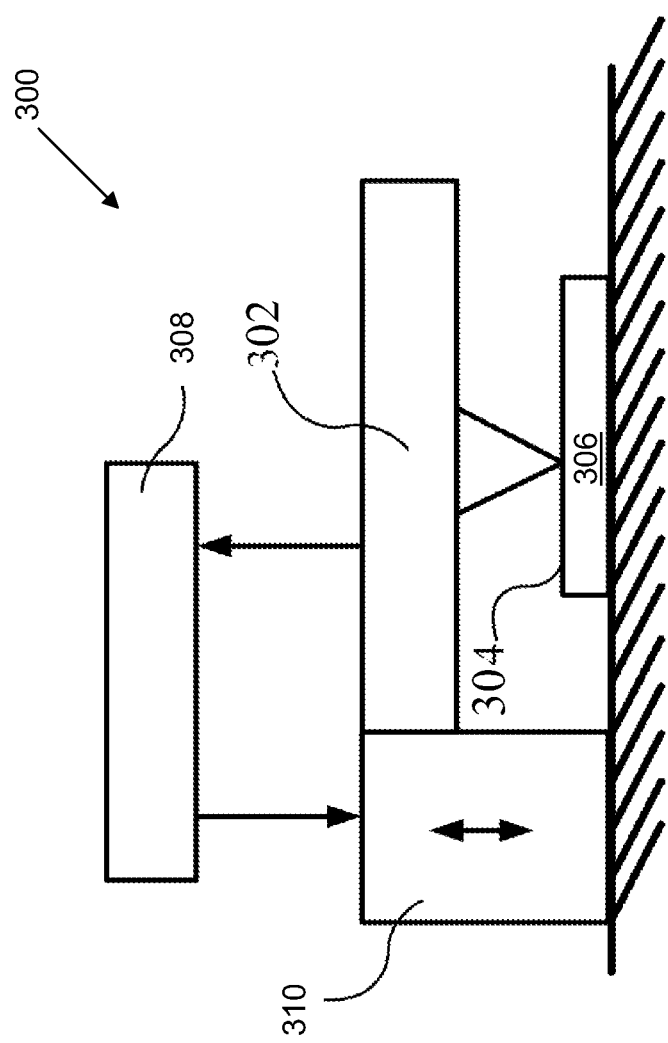
FIG. 3 is a schematic diagram of an alignment and anti-drift system.

Referring to FIG. 3, an alignment and anti-drift system 300 (henceforth referred to as anti-drift system 300) for use in a displacement measurement system aligns the relative position and/or orientation between a displacement sensor 302 and a top surface 304 of an object 306. Anti-drift system 300 also compensates for the drift of an output signal from displacement sensor 302. Anti-drift system 300 includes a low-speed feedback control driver 308, an actuator 310, and displacement sensor 302. Displacement sensor 302 may be any displacement sensor compatible with a precision displacement measurement system, such as a focus sensor or an astigmatic detection sensor. The relative position or relative orientation between displacement sensor 302 and the top surface of object 306 is measured by displacement sensor 302, which generates an output signal that is sent to feedback control driver 308. On the basis of the received signal, feedback control driver 308 drives actuator 310 to adjust or maintain the relative position or relative orientation between displacement sensor 302 and the top surface of object 306. For instance, to minimize or eliminate signal drift, actuator 310 is controlled such that a constant time-averaged displacement signal from displacement sensor 302 is maintained. In some embodiments, anti-drift system 300 maintains the output signal of displacement sensor 302 in a region of displacement sensor 302 that has linear or quasi-linear response characteristics in order to minimize measurement uncertainty and to maximize the sensitivity of the displacement sensor. In an astigmatic detection system, the focus error signal versus the translational displacement of the object surface exhibits a linear detection region in which the measured displacement signal has a high sensitivity to the displacement of the object.

Figure 4B:
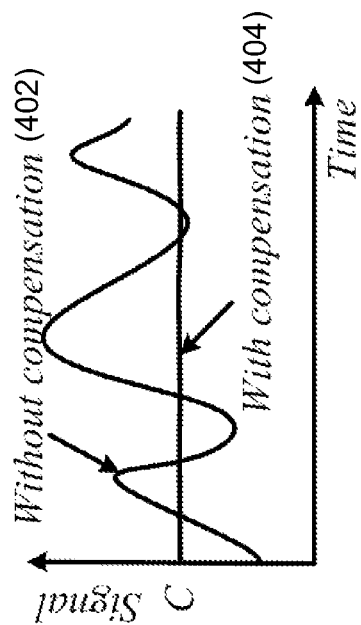
FIG. 4B is a plot showing the effect of compensation from an alignment and anti-drift system in the environment characterized by FIG. 4A.
Figure 4A:
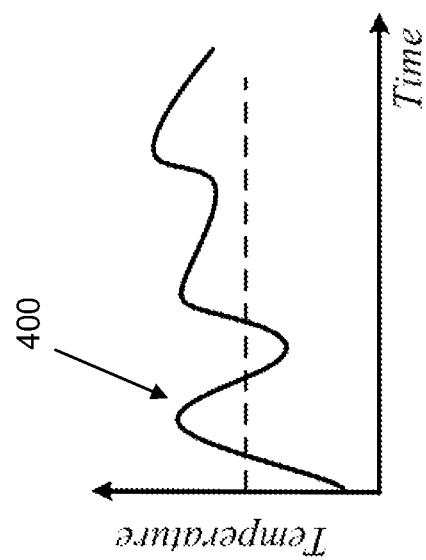
FIG. 4A is a plot of typical ambient temperature variations.

Referring to FIGS. 3, 4A, and 4B, an exemplary displacement measurement system is located in a room with a temperature variation shown in curve 400. Without compensation for drift associated with the temperature variation, the output signal of displacement sensor 302 has significant variability, as shown in curve 402. When anti-drift mechanism 300 is included with the displacement measurement system, the distance between the displacement sensor 302 and the object 306 being measured is maintained, assuming there is no mechanical vibration of the object. As a result, the output signal of displacement sensor 302 is much more stable, as shown in curve 404.

The output signal from displacement sensor 302 can be separated into two components: a high-frequency component and a low-frequency component. The high-frequency (i.e., fast-varying) component contains information about the mechanical movement of object 306 and is used for measurement purposes. The low-frequency (i.e., slowly-varying) component is related to signal drift and is used as the input signal of feedback control driver 308.

Figure 5:
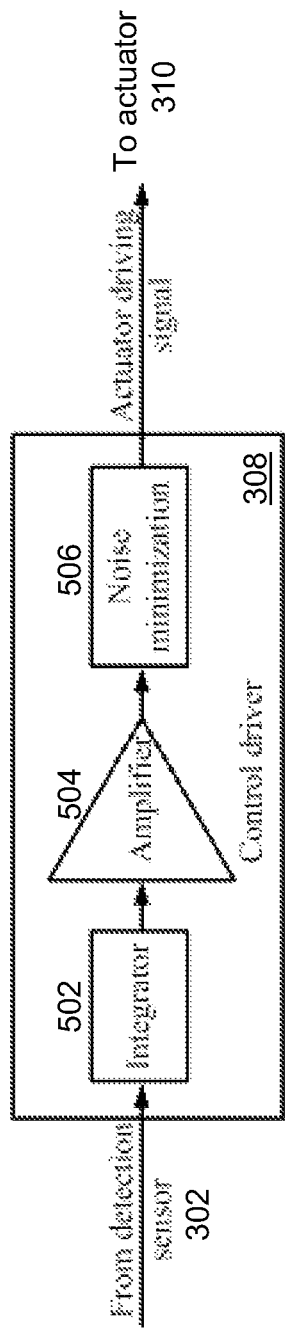
FIG. 5 is a block diagram of the feedback control driver of an alignment and anti-drift system.

Referring to FIG. 5, low-speed feedback control driver 308 includes an integrator 502, an amplifier 504, and a noise reduction unit 506. Noise reduction unit 506 includes a low pass filter, a passive voltage divider, or another noise reduction component for the optimization of the signal-to-noise ratio of the electronics of the feedback control driver. In some embodiments, a low pass filter and a passive voltage divider are both used simultaneously to minimize noise in the feedback control driver 308. The low pass filter is formed of low noise components such as metal film resistors and foil capacitors and is located between feedback control driver 308 and actuator 310. The passive voltage divider is formed of low noise metal film resistors. Feedback control driver 308 may be an analog-controller based circuit, a digital signal processing (DSP)-based system, or any other digital board or platform containing a software based controller or other controller that is combined with a suitable actuator driver.

The relative position and orientation between displacement sensor 302 and the top surface of object 306 are adjusted by selecting a set point of feedback control driver 308. Once the set point is selected, the driving speed and/or driving bandwidth of the feedback control driver 308 are set to achieve desired measurement conditions and are generally fixed throughout an entire displacement measurement. A low driving speed or driving bandwidth reduces noise in the measured displacement signal. However, the response of feedback control driver 308 is slower under these conditions, which slows tracking or and initial alignment of displacement sensor 302 to a desired position or orientation relative to object 306. Thus, in some embodiments, the driving speed and driving bandwidth of feedback control driver 308 are adjustable according to an algorithm. For instance, the driving speed or driving bandwidth is controlled to vary with the deviation between the detected displacement signal and the set point. When the deviation is large, such as at start-up of a measurement, a high driving speed or driving bandwidth is used to allow for rapid initial alignment; when the deviation is small, a lower driving speed or bandwidth is used.

Actuator 310 is driven by feedback control driver 308 at a speed slower than the displacement speed due to mechanical movement of object 306 but faster than the drift rate of the signal from displacement sensor 302. Actuator 310 is typically driven at a speed less than about 100 mHz, or between 1 μHz-100 mHz. In situations in which the object to be measured vibrates or undergoes displacement at a speed greater than 100 mHz or 100 nm/second, which is faster than the speed of compensation, the anti-drift mechanism only negligibly affects the measurement results of the displacement sensor.

In some embodiments, actuator 310 is a rigid structure such as a stack of piezoelectric ceramics. Because a rigid actuator can respond quickly to feedback control, the driving bandwidth of feedback control unit 308 can be relatively fast to compensate for the signal drift. In other embodiments, actuator 310 is a non-rigid structure such as a voice coil motor used in a typical DVD optical head. The stiffness and mass of the voice coil motor are such that a mechanical resonator is formed into which environmental vibrations are readily coupled, affecting or contaminating the displacement signals. In this case, to minimize the measurement noise, the driving bandwidth of feedback control driver 308 is preferably relatively low, although still faster than the thermal drift rate. In some embodiments, the vibrations of actuator 310 are further damped by adding a damping material or by other damping methods such as eddy current damping or magnetic fluids, as discussed in greater detail below.

Figure 6:
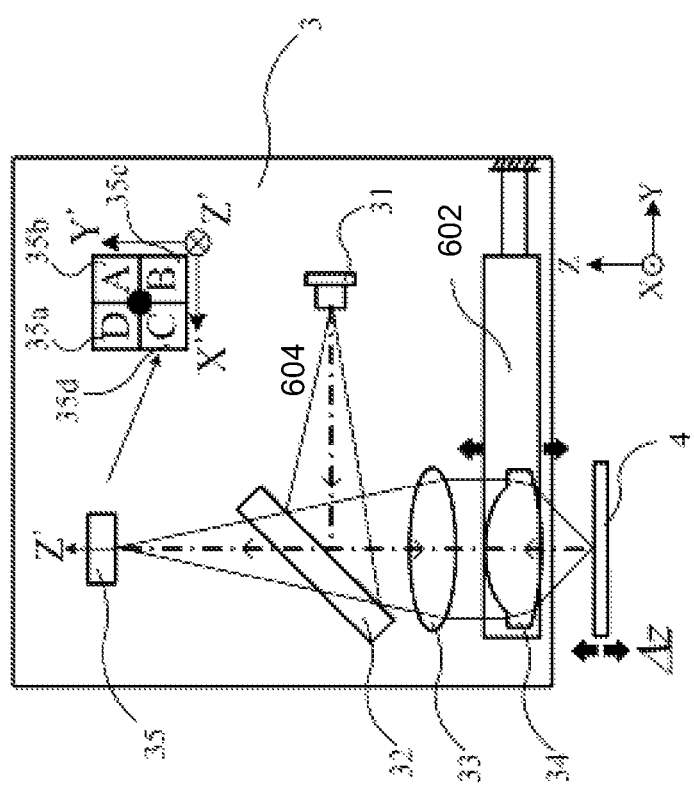
FIG. 6 is a schematic diagram of an astigmatic detection system (ADS) employing an alignment and anti-drift system.

Referring to FIG. 6, in one embodiment, an alignment and anti-drift mechanism is incorporated into an astigmatic detection system (ADS) 3 used for the measurement of the height, angle, and variations thereof of the surface of an object 4. A light source 31, such as a laser diode, emits a light beam 604, which is reflected by a beam splitter 32 through a collimator 33 and to an objective lens 34. Objective lens 34 focuses the light beam into a focused detection light spot on the surface of object 4. Light reflected from object 4 passes through objective lens 34, collimator 33, and beam splitter 32, and is focused on a position sensitive detector (PSD) assembly 35. PSD assembly 35 is composed of four quadrants 35a, 35b, 35c, and 35d housing photo sensors that output measurement signals $S_A$, $S_B$, $S_C$, and $S_D$, respectively. Translational and angular displacements of object 4 are determined based on the shape and position of the light spot focused on PSD assembly 35. The algorithms for processing measurement signals $S_A$, $S_B$, $S_C$, and $S_D$ to obtain the displacement of object 4 are described in U.S. Pat. No. 7,247,827, the contents of which are incorporated herein by reference.

Figure 7B:
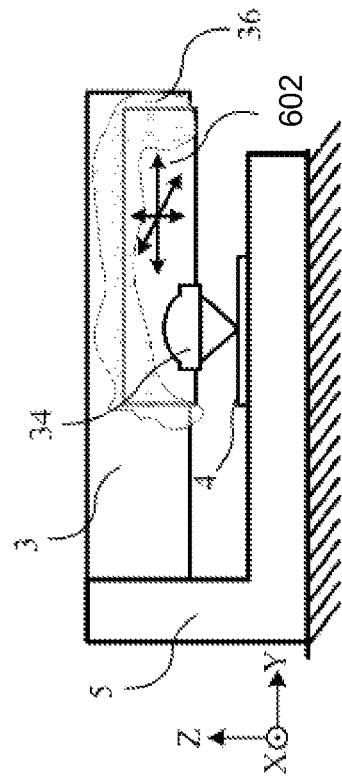
FIG. 7B is a block diagram of an alignment and anti-drift system with a damped actuator.
Figure 7A:
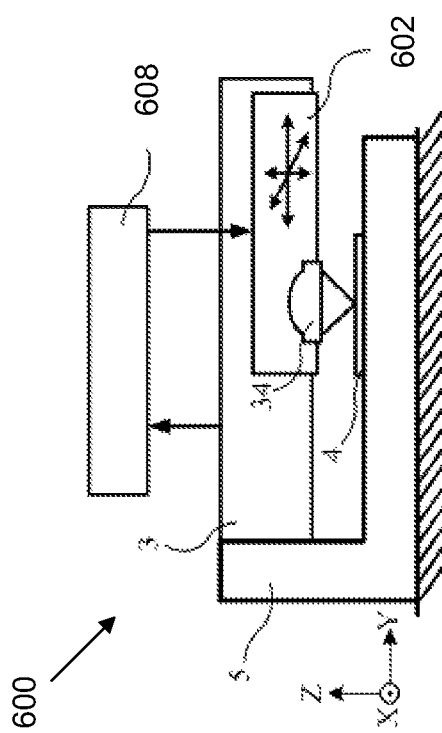
FIG. 7A is a block diagram of an ADS employing an alignment and anti-drift mechanism.

Referring now to FIGS. 6 and 7A, in an anti-drift mechanism 600 incorporated into ADS 3, objective lens 34 is fixed on an actuator 602, such as a voice coil motor, which moves along the direction of the impinging detection light beam 604 (i.e., the Z direction), thus changing the vertical position of the focal point of objective lens 34. ADS 3 and object 4 are fixed by a firm mechanical attachment, such as a metal frame 5. A feedback control driver 608, which receives processed displacement signals from PSD assembly 35 in ADS 3, controls the Z-axis motion of actuator 602, and thus controls the focus of objective lens 34, in order to maintain the processed displacement signals from PSD assembly 35 at fixed operational points (i.e., free of drift). The alignment and anti-drift mechanism maintains the focus error signal within a region of PSD assembly 35 having a maximum sensitivity to linear displacement and/or a region having a locally constant gradient. That is, the height of the surface of object 4 is kept near the focus position of the detection light beam. In some embodiments, actuator 602 also provides motion along the X-axis and the Y-axis for multi-axis linear alignment of the detection light beam on different positions of the surface of object 4.

Referring to FIG. 7B, if actuator 602 of ADS 3 is not sufficiently rigid, external vibrations will induce unwanted movements between ADS 3 and the surface of object 4. By damping the spring-mass system of actuator 602 with a damping material 36 having a particular viscosity, these unwanted movements can be greatly reduced. The working speed of actuator 602 can be adjusted by choosing an appropriate damping material and applying the damping material to the actuator in an appropriate quantity. Applying a high-viscosity damping material reduces the sensitivity of the system to external vibrations, but also lowers the working bandwidth or working speed of the actuator. Conversely, applying less damping material or using a damping material with a low viscosity increases the working bandwidth or working speed of the actuator, but also allows the system to be more affected by external vibrations. In general, the damping material is chosen to maintain a working bandwidth or working speed higher than the change rate of the ambient conditions in order to retain the ability to compensate for signal drift.

Figure 8:
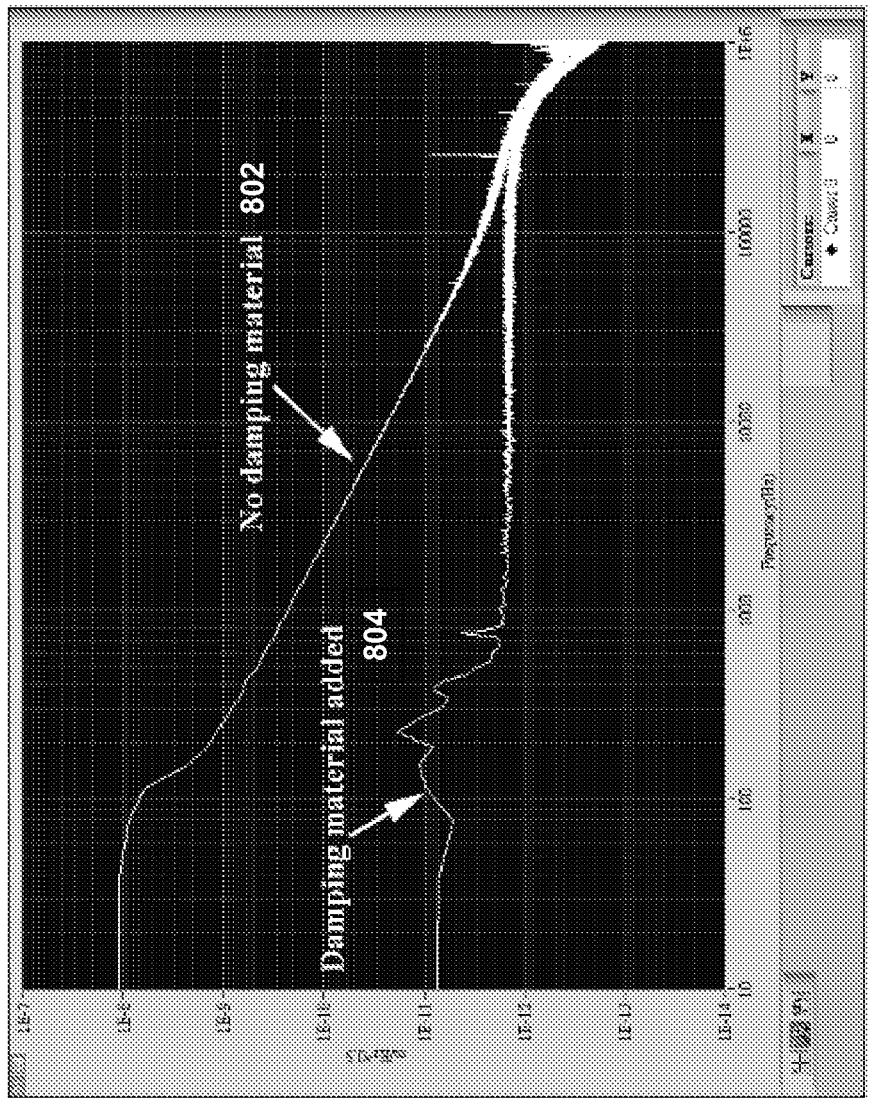
FIG. 8 is a frequency domain plot of a noise spectrum of an actuator.

Referring to FIG. 8, noise spectra for the detected focus error signal of ADS 3 are shown for an actuator without damping material (curve 802) and an actuator with damping material (curve 804). The actuator is a voice coil motor. Vibrations (units of $m/Hz^{1/2}$) of the surface of object 4 are shown in the frequency domain. In this example, the damping material is a cream-like oil having a kinematic viscosity at 20° C. (68° F.) of between 0.1-100 $mm^2/s$, such as the commercially available products DC-976 Dow Corning high vacuum grease or Krytox® GPL 223 Anti-Corrosion Perfluorinated Polyether Grease manufactured by DuPont. The damping material reduces the resonance amplitude and the quality factor of actuator 602, thus changing the resonance frequency of the actuator. With no damping material (curve 802), the noise below about 100 Hz, which is due primarily to mechanical vibrations, is on the order of $10^{-8}$ $m/Hz^{1/2}$. With damping material (curve 804), this low frequency noise is reduced by about three orders of magnitude. Proper damping treatment of actuator 602 thus increases system stability and reduces noise induced in the actuator by vibrations external to the system.

Figure 9:
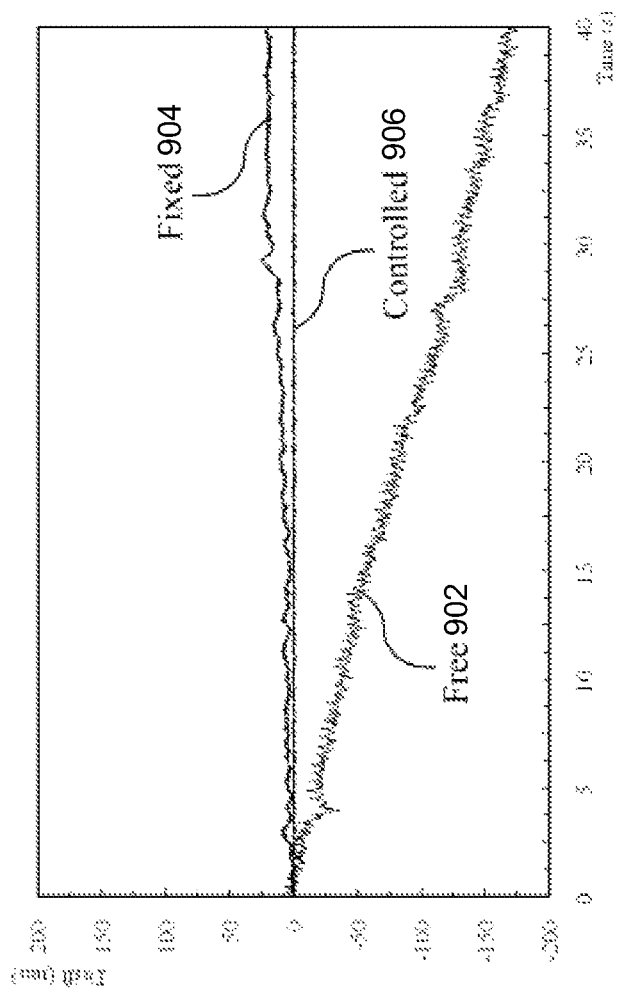
FIG. 9 is a plot of signal drift in various astigmatic detection systems.

Referring to FIG. 9, the measured focus error signal is compared for a DVD optical head based ADS operated with various control mechanisms. In a first condition (curve 902) a voice coil motor actuator is free, with no feedback control and no damping material. In this case, the focus error signal drifts at about 4 nm/second; higher-frequency fluctuations induced by external vibrations are also evident in the signal. In a second condition (curve 904), the voice coil motor is fixed on the ADS with glue but no feedback control is used. In this case, the high-frequency vibrational fluctuations are greatly reduced due to the rigidity of the structure. Nevertheless, the focus error signal still drifts at a rate of about 0.25 nm/second. In a third condition, shown in curve 906, the ADS is modified with an alignment and anti-drift mechanism such as that shown in FIG. 7B. That is, damping material is added to the actuator and a low-speed feedback control driver is employed to control the actuator. In this case, the focus error signal of the ADS is very close to zero and does not drift during the measurement. Indeed, good alignment of the detection light beam on the object surface with little drift can be maintained for more than one day, indicating the effectiveness of the alignment and anti-drift mechanism. Furthermore, the focus error signal in this case shows very little vibrational noise, suggesting that high resolution displacement measurements are possible even with a non-rigid actuator.

Figure 10:
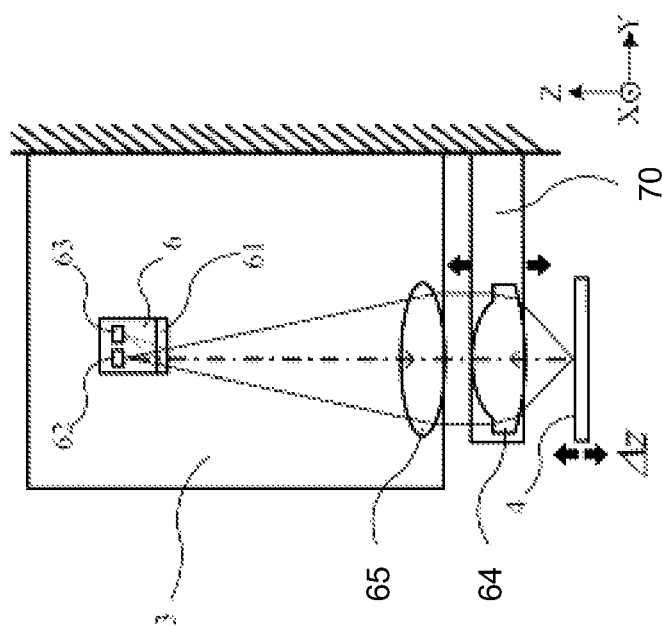
FIG. 10 is a schematic diagram of a laser hologram unit employing an alignment and anti-drift system.
Figure 11A:
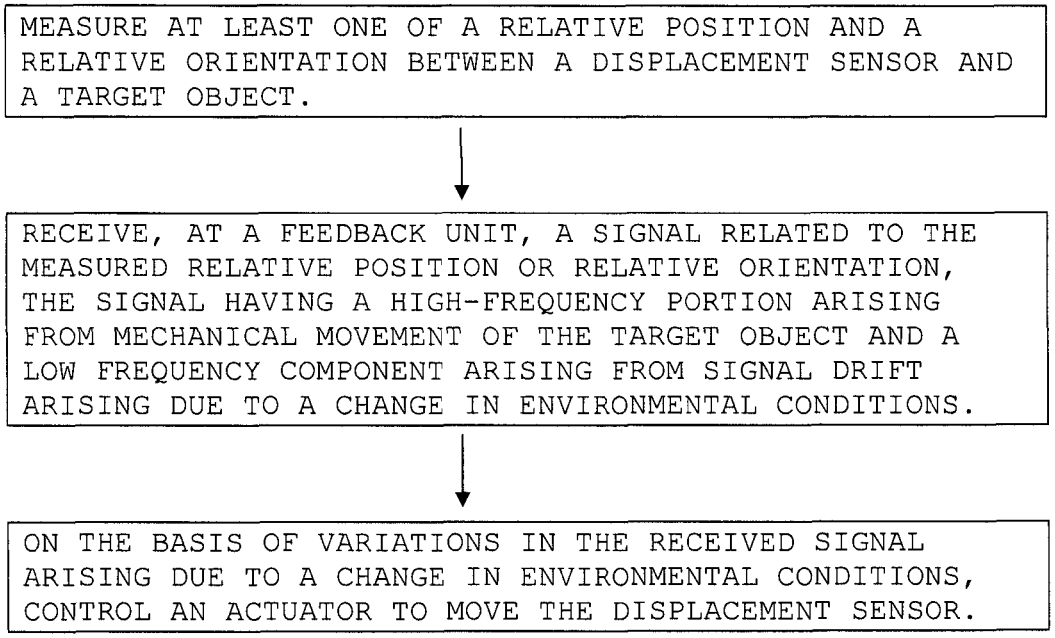
Figure 11C:
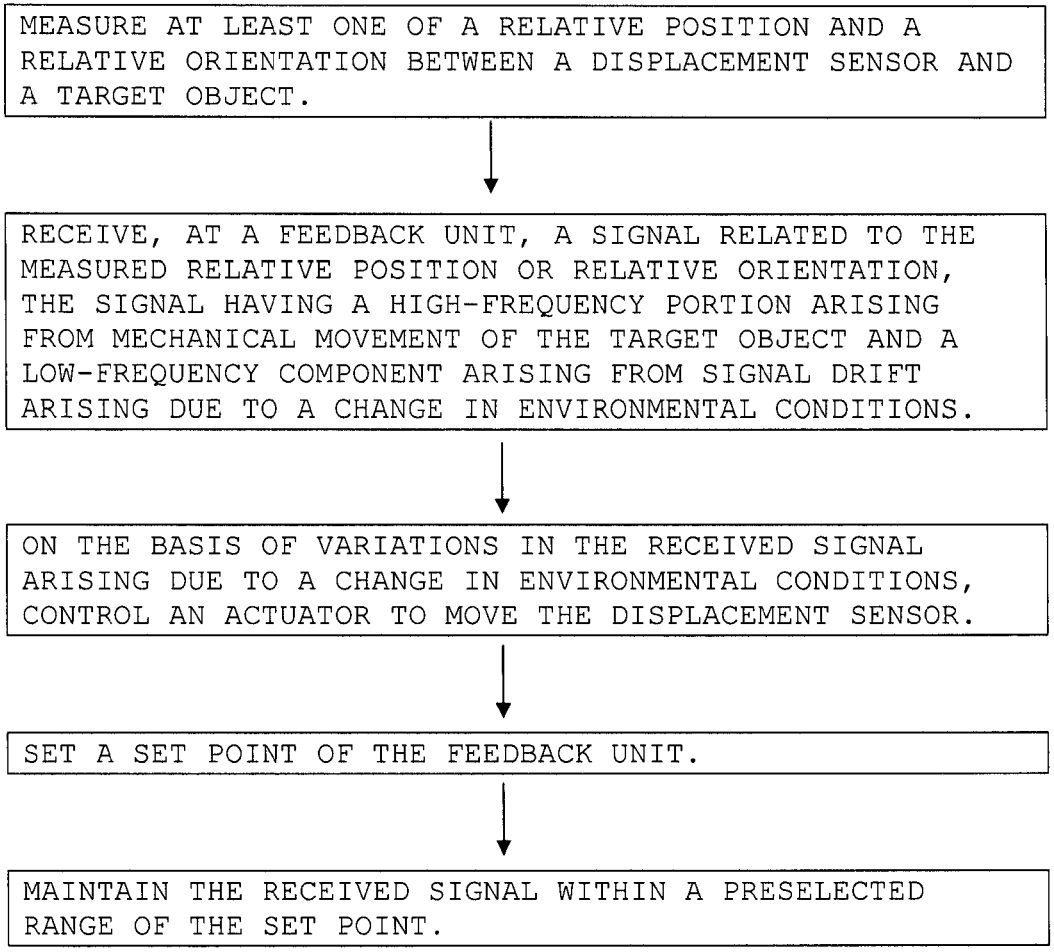
Figure 11E:
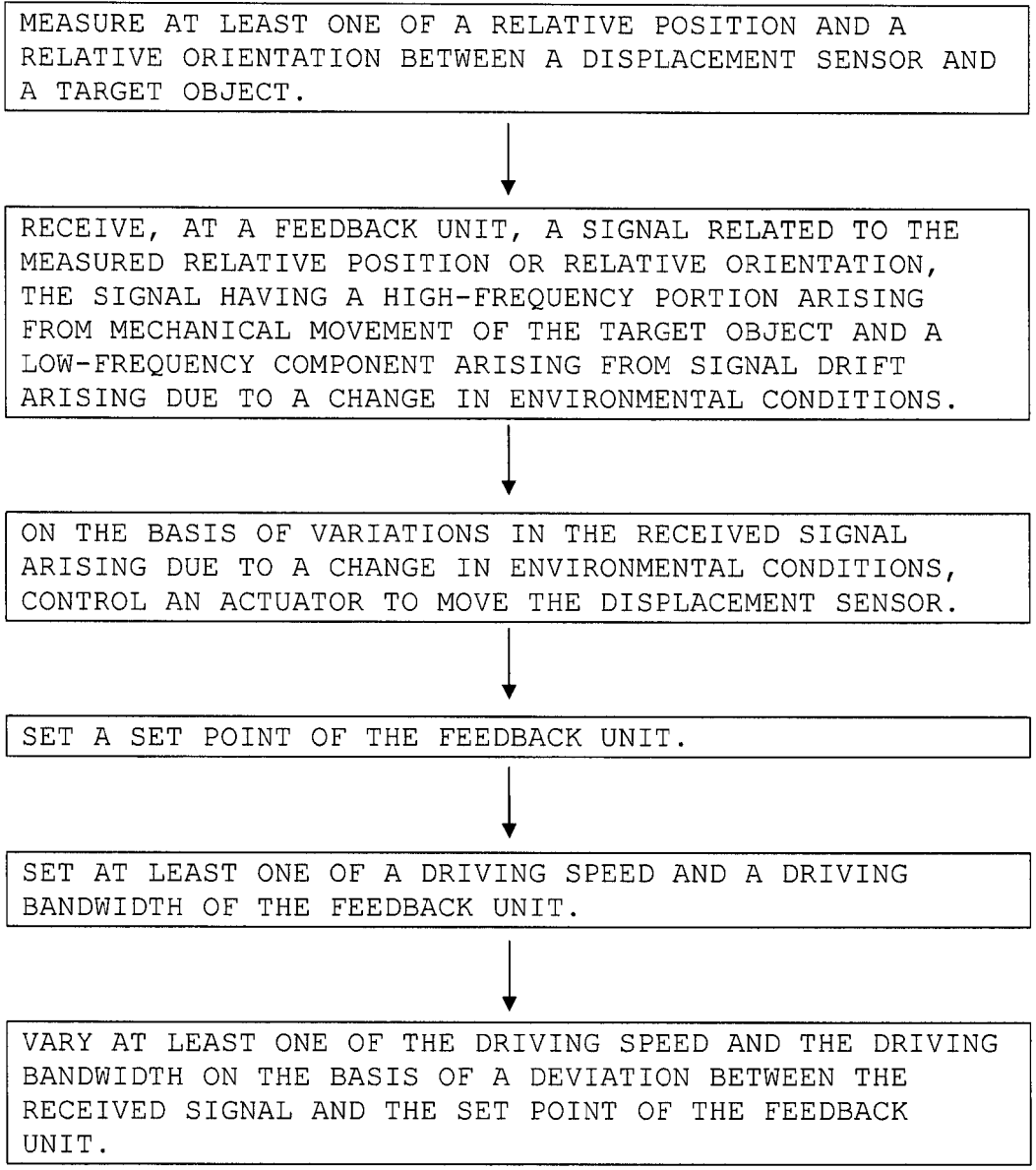

Referring to FIG. 10, ADS 3 including an alignment and anti-drift mechanism is employed as the focus sensor of a laser hologram unit 6. This setup is used, for instance, in CD and DVD optical drives. A laser diode 62 emits a light beam which passes through a collimator 65 and an objective lens 64 and projects onto the surface of an object 4 at or near the focus of objective lens 64, forming a detection light spot on the surface of object 4. A light beam reflected from the surface of object 4 passes through objective lens 64, collimator 63, and a holographic optical element 61, and is focused on a photo detector 63. The Z-direction displacement of the surface of object 4 can be determined from the focus error signal by calculating detected signals from photo detector 63.

Objective lens 64 is attached to an actuator 70, typically a voice coil motor, which can be moved at least along the direction of the impinging detection light beam (i.e., the Z direction). The actuator is controlled by a low-speed feedback driver (not shown) to move objective lens 64 in the Z direction to change the focus condition so that the output of the photo detector 63 is maintained at a desired value. In some embodiments, actuator 70 also provides additional one- or two-dimensional motion along the X axis and/or Y axis for multi-axis linear alignment of the focused detection light beam on different positions on the surface of object 4.

The alignment and anti-drift mechanism described herein can be used to detect mechanical motion (i.e., translational or angular displacement) of microfabricated elements, such as microfabricated cantilevers or other microelectromechanical system (MEMS) devices. This mechanism is thus applicable to techniques such as atomic force microscopy (AFM) and to chemical and biological sensing based on the detection of static deformation or dynamic motion of suspended elements in MEMS and nanoelectromechanical systems (NEMS). When applied to these techniques, the object 4 referred to above is an AFM cantilever or a suspended element in MEMS or NEMS applications, respectively. The object 4 may also be a generic sample. For instance, as shown in FIG. 6, the alignment and anti-drift mechanism is used with a surface profilometer to detect the height and/or tilt angle of the surface of sample 4. In this case, the alignment and anti-drift mechanism aligns the focused detection beam on the sample surface and compensates for slowly-varying signal drifts that occur during fast scanning of the sample.

In the embodiments described above, the displacement sensor detects the vertical height between the sensor and the surface of the object, i.e., the separation between the sensor and the object. The alignment and anti-drift mechanism enables adjustment of the height to a desired position and maintenance of the height without drift. This mechanism can also be used to adjust and maintain the lateral position of the object. In some embodiments, the lateral position of the object is maintained and adjusted by using image processing to calculate the slow drift of the object as described in co-pending U.S. application Ser. No. 12/604,711, filed Oct. 19, 2009, and entitled "Optical Imaging System." In other embodiments, the lateral position of the object is maintained and adjusted using the methods described in pending U.S. Application Publication No. 2009/0225305, entitled "The Optical Multi-Axis Linear Displacement Measurement System and a Method Thereof." In other embodiments, the alignment and anti-drift mechanism is used for adjustment and maintenance of a tilt angle of the object surface relative to the beam axis of the displacement sensor (i.e., the direction perpendicular to the sensor), provided the displacement sensor is capable of detecting the tilt angle and the actuator is capable of adjusting the tilt angle. In some embodiments, it is also possible to achieve alignment and maintenance of height and tilt angle simultaneously. In these embodiments, multiple feedback control drivers are used, each driver controlling an actuator. For instance, some DVD optical heads are equipped with voice coil motors that allow the adjustment of two-dimensional linear displacements (i.e., along the beam axis and perpendicular to the beam axis) and one-dimensional tilt of the objective lens. An alignment and anti-drift mechanism applied to these DVD heads would enable alignment and maintenance of the positioning in one dimension and the tilt in two dimensions of an optical disk to be read by the DVD head.

It is to be understood that the foregoing description is intended to illustrate and not to limit the scope of the invention, which is defined by the scope of the appended claims. Other embodiments are within the scope of the following claims.

What is claimed is:

1. A system comprising:
a displacement sensor configured to measure at least one of a relative position and a relative orientation between an element thereof and a target object, said displacement sensor providing a signal having a high-frequency portion arising from mechanical movement of said target object and a low-frequency component arising from signal drift;
an actuator connected to the displacement sensor;
and a feedback unit that receives said low-frequency component of said signal from the displacement sensor, said low-frequency component being related to the measured relative position or relative orientation, wherein said feedback unit, by itself, based on said low-frequency component, controls the actuator to move a part of the displacement sensor on the basis of variations in the received signal arising due to a change in environmental conditions.

2. The system of claim 1, wherein the change in environmental conditions includes a change in temperature.

3. The system of claim 2, wherein the change in environmental conditions includes a local change in temperature.

4. The system of claim 1, wherein the variations in the received signal further arise from a relaxation of mechanical stress in the system.

5. The system of claim 1, wherein the frequency of the low frequency component is less than about 1 Hz.

6. The system of claim 5, wherein the frequency of the low frequency component is between about 1 uHz and 100 mHz.

7. The system of claim 1, wherein the displacement sensor includes a focus sensor.

8. The system of claim 1, wherein the displacement sensor comprises:
a photo detector; and an objective lens positioned between the target object and the photo detector.

9. The system of claim 8, wherein the actuator is connected to the objective lens and the feedback unit controls the actuator to move the objective lens.

10. The system of claim 1, wherein the actuator includes a stack of piezoelectric ceramics.

11. The system of claim 1, wherein the actuator includes a voice coil motor.

12. The system of claim 1, wherein the actuator includes a damping material.

13. The system of claim 12, wherein the damping material is selected to reduce at least one of a resonance amplitude and a quality factor of the actuator.

14. The system of claim 12, wherein the damping material is selected to change a resonance frequency of the actuator.

15. The system of claim 1, wherein the feedback unit comprises: an integrator; an amplifier; and a noise minimization unit.

16. The system of claim 1, wherein the relative position includes a vertical separation between the displacement sensor and the target object.

17. The system of claim 1, wherein the relative position includes a lateral position of the displacement sensor relative to the target object.

18. The system of claim 1, wherein the change in environmental conditions includes a change in humidity.

19. A method comprising:
measuring at least one of a relative position and a relative orientation between an element of a displacement sensor and a target object;
receiving, at a feedback unit, a signal related to the measured relative position or relative orientation, said signal having a high-frequency portion arising from mechanical movement of said target object and a low-frequency component arising from signal drift arising due to a change in environmental conditions;
wherein a feedback unit, by itself, based on said low-frequency component, and on the basis of variations in the received signal arising due to a change in environmental conditions, controlling an actuator to move a part of the displacement sensor.

20. The method of claim 19, further comprising setting a set point of the feedback unit.

21. The method of claim 20, wherein controlling the actuator to move the displacement sensor comprises maintaining the received signal within a preselected range of the set point.

22. The method of claim 20, further comprising setting at least one of a driving speed and a driving bandwidth of the feedback unit.

23. The method of claim 22, wherein at least one of the driving speed and the driving bandwidth is varied on the basis of a deviation between the received signal and the set point of the feedback unit.

24. The method of claim 19, wherein controlling the actuator to move the part of the displacement sensor comprises maintaining a substantially constant relative position or relative orientation between the part of the displacement sensor and the target object.

25. The method of claim 19, wherein controlling the actuator to move the part of the displacement sensor comprises reducing the variations in the relative position or relative orientation between the part of the displacement sensor and the target object.

26. The method of claim 19, wherein controlling the actuator to move the part of the displacement sensor comprises controlling the actuator to move the part of the displacement sensor vertically relative to the target object.

27. The method of claim 19, wherein controlling the actuator to move the part of the displacement sensor comprises controlling the actuator to move the part of the displacement sensor laterally relative to the target object.

* * * * *